UNITED STATES PATENT OFFICE.

JOHN A. JUST, OF SYRACUSE, NEW YORK.

INSOLUBLE COATING COMPOSITION.

SPECIFICATION forming part of Letters Patent No. 713,309, dated November 11, 1902.

Application filed May 8, 1902. Serial No. 106,484. (No specimens.)

*To all whom it may concern:*

Be it known that I, JOHN AUGUSTUS JUST, a citizen of the United States, residing at 116 East Castle street, in the city of Syracuse, in the county of Onondaga and State of New York, have invented certain new and useful Improvements in Casein Compositions, of which the following is a specification.

This invention relates to improvements in casein compositions to be used for paints and adhesive materials.

My object is to produce a water-paint, cheap and durable, the several ingredients of which are hereinafter described, and specifically set forth in the claims hereunto annexed.

I find by experiment and practice that the oxids or the hydrates of barium in solution will dissolve casein, and that the solution thus produced, after the water has been driven off, leaves a casein composition which is insoluble in water, and therefore when applied as a coating or paint may be used to withstand the action of the elements and the moisture in the atmosphere. It in practice serves as an adhesive coating or varnish without any filler comprising coloring-matter or mineral matter. I have found that oxids and hydrates of barium when dry are readily soluble in water, and when compounded with dry casein, either with or without other substances, and when mixed with water form a valuable base or adhesive mixture to which mineral coloring-matter finely divided may be added.

To form such a composition, I first take twenty-five parts, by weight, of barium hydrate and seventy-five parts, by weight, of casein finely ground. These two ingredients may be mixed together, and they then form an article of commerce, and paint or adhesive material may be formed of them by the addition of water and the addition of mineral compound of any color desired.

I have also found by experiment that substantially only the above proportions will produce a composition which is commercially and practically valuable.

I have also found that to the above composition may be added clay, talc, blanc-fixe, pearl-hardening, &c., to form a paper coating or size.

Having thus described my invention, what I claim, and desire to secure by Letters Patent, is—

1. The herein-described casein composition comprising the following ingredients—barium hydrate, pulverized dry casein and mixed with sufficient water to make the compound pliable and mineral coloring-matter.

2. The herein-described casein composition comprising the following ingredients—barium hydrate, pulverized dry casein and mineral matter in finely-divided state.

In testimony whereof I have signed my name to this specification in presence of two subscribing witnesses.

JOHN A. JUST.

Witnesses:
WILSON R. HARE,
D. H. STRACHAN.